April 4, 1939.   J. A. ORR   2,152,707
GROUND VASE
Filed Jan. 13, 1937
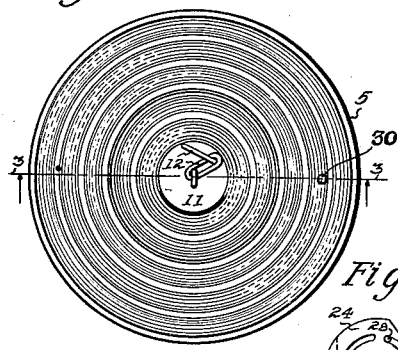
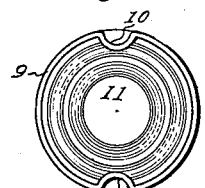
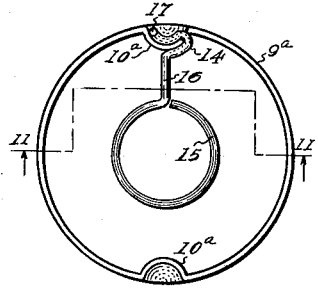
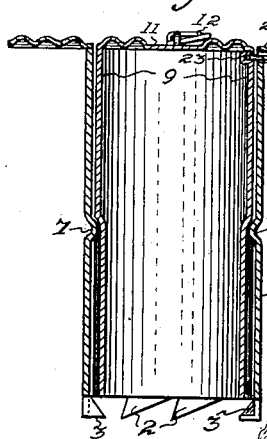
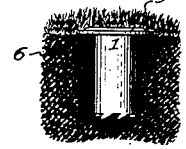
Inventor
J. A. Orr
H. J. Sanders
Atty.

Patented Apr. 4, 1939

2,152,707

UNITED STATES PATENT OFFICE 2,152,707

GROUND VASE

John A. Orr, Chicago, Ill.

Application January 13, 1937, Serial No. 120,354

2 Claims. (Cl. 47—41)

This invention relates to telescopic flower vases and more particularly to those of the, so called, earth or ground vase type for use primarily in cemeteries, although capable of a variety of other uses. One object is to provide a vase formed or provided with ground cutting means so that it may be used to cut or dig a pit in the ground for its reception without the use of tools or other cutting means of any kind. The vase is adapted for retention in this small ground cavity wherein, when not in use, it is out of the way of lawn mowers and other garden trimming tools that may pass freely over it without danger of contact and that when in use projects more or less above the ground surface to carry and display flowers, bouquets and the like, means being provided in this extended position to carry large or small flowers or bouquets with equal facility.

A further object is to provide a telescopic vase including a removable, reversible inner or cup section which may serve as a water carrier and which is provided with a novel handle to facilitate its removal from the cylindrical shell section and which handle is disposed neatly in an out of the way position when the vase is not in use.

A further object is to provide a flower vase that is inexpensive to manufacture, durable in use, attractive in appearance and compact in assembly and that is self-contained in the sense that it may be put into use, withdrawn from use, transported or "trans-planted" without the use of tools or other accessories of any kind.

With the foregoing and other objects in view the invention consists in the combination and arrangement of parts to be hereinafter described, pointed out in the claims and illustrated in the accompanying drawing which forms a part of this patent and in which—

Fig. 1 is a top plan view of the vase in telescoped position.

Fig. 2 is a side view, extended, partly in elevation and partly in section, with the open end of the cup section uppermost.

Fig. 3 is a central, longitudinal sectional view taken on the line 3—3 of Fig. 1.

Fig. 4 is an inverted plan view of the vase, the lock being omitted. Fig. 5 is an end or plan view of the inner cup section of the vase, removed, and its open end uppermost.

Fig. 6 is a fragmentary plan view of Fig. 7 without the lock.

Fig. 7 is a fragmentary sectional view of the lower end of a slightly modified form of the outer or shell section.

Fig. 8 is a view of the vase in the ground and not in use.

Fig. 9 is a view of the vase in the ground showing its use in its extended position.

Fig. 10 is a top plan view of a modified form of cup section provided with a small bouquet holder.

Fig. 11 is a fragmentary sectional view through Fig. 10 on the line 11—11 thereof.

Fig. 12 is a view similar to Fig. 10 but of a further slightly modified form of the cup section with a small bouquet holder.

Fig. 13 is a longitudinal axial fragmentary sectional view through Fig. 12 with two positions of the small bouquet holder shown.

Fig. 14 is a plan view of the locking cam.

Like reference characters denote corresponding parts throughout.

The reference numeral 1 denotes the open ended cylindrical outer shell, or 1a in Fig. 7; said shell 1 terminating at one end in the straight teeth 2 and inwardly extending teeth 3, or being provided with the same; the shell 1a being formed with a cutting edge 4, the opposite end of each shell being provided with a large, preferably crimped, outer flange or rim 5 which may rest upon the surface of the ground 6 when the shell is in its small pit in the earth and which may be used as a handle to dig the pit to receive the shell. To dig a pit to receive the shell a person grasps the rim and rotates the shell with the teeth in engagement with the ground or with the sharp cutting edge 4 in ground engagement. No tool is thus required to dig a pit of proper diameter and depth to snugly receive and retain the shell and the depth of the pit is such that the rim 5 will rest upon the ground surface when the pit is completed.

The shell is formed further with a pair of outwardly disposed oppositely positioned dents 7 thus forming inwardly disposed beads 8 for a purpose to be hereinafter set forth. Telescopically and removably received within the shell 1 through its flanged end is the elongated cup 9, said cup being formed peripherally with the oppositely disposed longitudinally extending inwardly bulged grooves 10 that lead from the mouth of the cup somewhat more than one-half the depth of the same and that at their inner ends gradually diverge outwardly into the cup periphery. When the cup is introduced, open end first, into the flanged end of the shell with the grooves 10 in line with the beads 8 of said shell the beads will ride through the grooves to the inner ends of the same, further movement of said cup into the shell being then arrested, the depth of the grooves in the cup and the location of the beads from the flanged end of the shell being such that the cup will then be fully telescoped into the shell, the inverted bottom of the cup then being substantially flush with the shell flange, the mouth of the cup being spaced slightly from the toothed or sharpened end of the shell. In this position the vase is inoperative and when so received in its ground pit is out of the way of lawn mowers and like tools as shown in Fig. 8. The central portion 11 of the base of the cup is pressed inwardly slightly to form a depression to receive the short chain-link handle 12 which then forms no obstruction for the lawn mower, said handle when grasped manually serving as a means for the ready withdrawal of the cup from the shell to permit cup disposal in reversed or upright operative position in the shell. In this operative cup position it may be partly filled with water and then provided with a bunch of flowers which will be supported neatly and kept fresh thereby for a considerable period of time. The bottom of the cup now rests upon the beads 8 of the shell and its open end is disposed substantially above the ground in the position shown in Fig. 9. When the cup is completely removed from the shell it may serve as a water carrier or the like. The diameter of the cup is such that it fits snugly into the shell but may be readily withdrawn or rotated in its partly telescoped position.

Referring now to Figs. 10 and 11 the cup 9a is formed in one of its grooves 10a with a longitudinal slot 13 opening inwardly from the cup mouth to releasably receive the curved resilient portion 14 of the ring 15 connected thereto by the stem 16, said curved portion 14 terminating remote from the ring in the straight end 17 to form a bouquet holder. This holder is preferably made of a piece of wire. The curved portion 14 is shaped to fit snugly about one wall of slot 13, the straight end 17 then bearing against the cup section 10a to retain the ring 15 in spaced relation to the cup periphery and substantially parallel thereto as shown in Fig. 10 to receive a small bouquet in much the same manner as the cup supports the flowers 18, Fig. 9. When not in use the bouquet holder is removed from the slotted portion of the cup and may be dropped down into the same in an out of the way position.

Referring now to Figs. 12 and 13 the cup 9b is formed with integral inwardly extending oppositely disposed ears 19, each perforated to receive the ends of the resilient bouquet holder comprising the ring-like body portion 20 formed with the extensions 21, the ends thereof being removably disposed in said ears to support the ring yieldingly in normal full line position substantially at right angles to the cup. The bouquet is disposed in the ring-like portion 20 and there supported, the stem extending into the cup and resting upon the bottom thereof. When not in use the extensions 21 may be manually pressed together to permit removal of the holder or the same may be manually moved downwardly into proximity to, or against, the wall of the cup as shown in dotted lines.

The vase is preferably provided with a device for locking its sections together so that the cup section cannot be removed by unauthorized persons. When the vase is not in use and is disposed in its out of the way position in the ground it is an easy matter to remove the cup section by its handle and perhaps not return it. Such action by an unauthorized person would cause inconvenience. To prevent this the shell is formed with a longitudinal slot 22 near its upper end just below the flange 5 and the cup section is formed with a groove 23 near its closed end in juxtaposition to the slot when the cup is in its inverted completely telescoped position, Fig. 3.

A cam 24 of circular contour except for its straight edge 25 is formed with two similar opposed slots 26, 27 in which are disposed respectively the pins 28, 29 carried by the flange 5 to serve as cam guides, said cam being fast to an upstanding pin 30 that extends through and above the flange and is formed with an enlarged upper or free end, square in cross section, to receive one end of a square key (not shown) whereby it, together with the cam, may be oscillated to cause a portion of the round edge of the cam to enter the slot 22 and groove 23 to lock the shell and cup in closed completely telescoped position, or to move said rounded edge out of said slot and groove, the straight edge 25 then being positioned adjacent said portions at which time the shell and cup are in unlocked relation. Frictional contact of the cam with the flange will normally prevent rotation of the cam without the use of the key which is to be kept in the possession of the owner or user of the vase.

Referring again to the inwardly extending teeth 3, each is formed with a lower cutting edge 0 that extends inwardly and that is connected to the shell edge proper by an oblique, the tooth having a somewhat shovel or scoop effect in use.

What is claimed is:

1. In a ground vase, a shell, beads in said shell, a reversible cup formed with grooves to receive said beads, said cup having a base depression, and a chain-link handle secured in the said vase depression.

2. In a vase, a shell, and teeth formed along one edge of said shell, certain of said teeth being formed with inwardly extending cutting edges and with oblique edges connecting the same to said shell.

JOHN A. ORR.